United States Patent
Albert et al.

(10) Patent No.: US 8,602,075 B2
(45) Date of Patent: *Dec. 10, 2013

(54) SELF-SEALING COMPOSITION FOR A PNEUMATIC OBJECT

(75) Inventors: Loïc Albert, Clermont-Ferrand (FR); Emmanuel Custodero, Chamalieres (FR); Pierre Lesage, Clermont-Ferrand (FR); José Merino Lopez, Riom (FR); Lucien Silvain, Clermont-Ferrand (FR)

(73) Assignee: Michelin Recherche et Technique S.A, Granges-Paccot (CH)

(*) Notice: Subject to any disclaimer, the term of this patent is extended or adjusted under 35 U.S.C. 154(b) by 663 days.

This patent is subject to a terminal disclaimer.

(21) Appl. No.: 12/520,856

(22) PCT Filed: Dec. 19, 2007

(86) PCT No.: PCT/EP2007/011154
§ 371 (c)(1),
(2), (4) Date: Nov. 9, 2009

(87) PCT Pub. No.: WO2008/080557
PCT Pub. Date: Jul. 10, 2008

(65) Prior Publication Data
US 2010/0051158 A1    Mar. 4, 2010

(30) Foreign Application Priority Data
Dec. 22, 2006 (FR) .................................. 06 11307

(51) Int. Cl.
*B60C 5/14* (2006.01)
*B60C 19/12* (2006.01)

(52) U.S. Cl.
USPC ............ 152/503; 152/504; 523/166; 156/115

(58) Field of Classification Search
USPC .................... 152/502–509; 156/115; 523/166
See application file for complete search history.

(56) References Cited

U.S. PATENT DOCUMENTS 4,140,167 A * 2/1979 Bohm et al. .................. 152/505
4,216,812 A * 8/1980 Bourne ......................... 152/504

(Continued)

FOREIGN PATENT DOCUMENTS

EP    0 302 400    2/1989
EP    1 674 542    6/2006

(Continued)

OTHER PUBLICATIONS

Kirk-Othmer Encyclopedia of Chemical Technology: Thermoplastic Elastomers, 2002.*

*Primary Examiner* — Justin Fischer
*Assistant Examiner* — Robert Dye
(74) *Attorney, Agent, or Firm* — Cozen O'Connor

(57) ABSTRACT

A self-sealing elastomer composition, in an inflatable article such as a pneumatic tire (1), such composition comprising, as predominant elastomer, a thermoplastic styrene (TPS) elastomer and an extender oil with a content of between 200 and 700 phe (parts per hundred parts of elastomer by weight). An airtight puncture-resistant laminate (10) that can be used in particular in said inflatable article (1), comprises a puncture-resistant first layer (10a) comprising said self-sealing composition and an airtight second layer (10b), for example based on butyl rubber. An inflatable article comprises such a self-sealing composition or such an airtight puncture-resistant laminate.

22 Claims, 1 Drawing Sheet

(56) References Cited

U.S. PATENT DOCUMENTS

| | | | |
|---|---|---|---|
| 4,228,839 A * | 10/1980 | Bohm et al. | 152/504 |
| 4,359,078 A | 11/1982 | Egan | |
| 4,833,193 A * | 5/1989 | Sieverding | 524/486 |
| 5,618,882 A * | 4/1997 | Hammond et al. | 525/92 D |
| 2005/0184619 A1* | 8/2005 | Chen | 310/309 |
| 2005/0266192 A1* | 12/2005 | Yoneda et al. | 428/36.4 |
| 2006/0005909 A1* | 1/2006 | Serra et al. | 152/504 |
| 2006/0052535 A1* | 3/2006 | Ajbani et al. | 525/88 |
| 2010/0032070 A1* | 2/2010 | Albert et al. | 152/504 |
| 2010/0051158 A1* | 3/2010 | Albert et al. | 152/503 |
| 2010/0300593 A1* | 12/2010 | Merino Lopez et al. | 152/504 |

FOREIGN PATENT DOCUMENTS

| | | |
|---|---|---|
| JP | 54 027105 | 3/1979 |
| WO | WO99/62998 * | 12/1999 |
| WO | WO 99/62998 | 12/1999 |

* cited by examiner

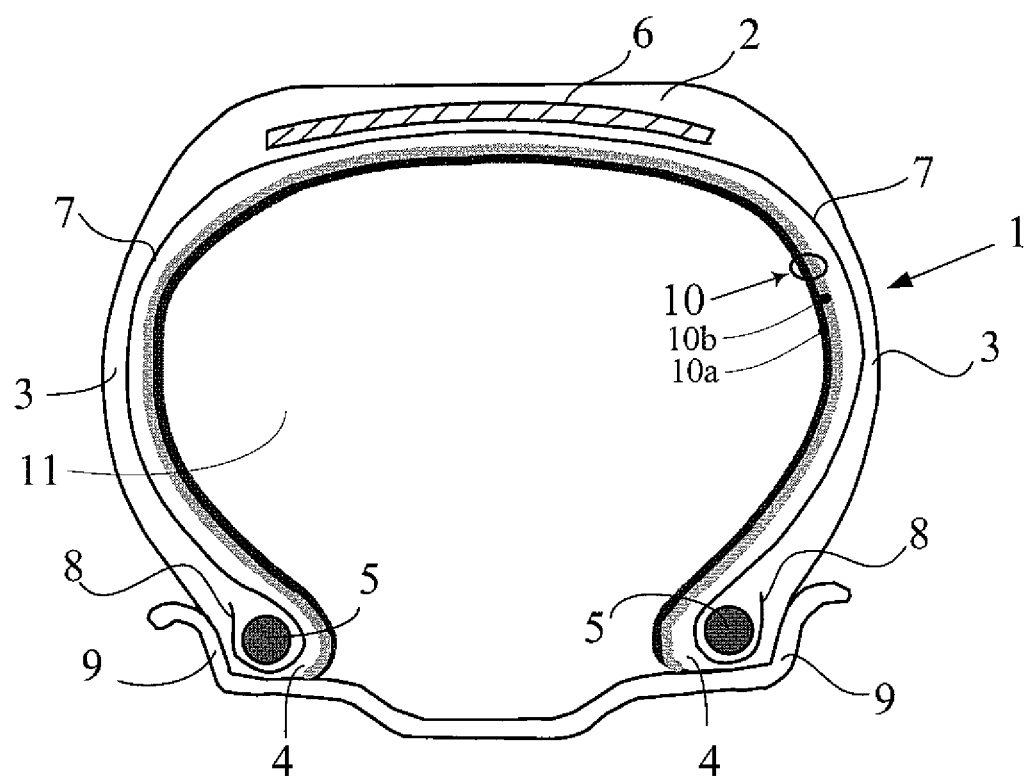

SELF-SEALING COMPOSITION FOR A PNEUMATIC OBJECT

RELATED APPLICATIONS

This is a U.S. national stage of application No. PCT/EP2007/011154 filed on Dec. 19, 2007.

This patent application claims the priority of French patent application no. 06/11307 filed Dec. 22, 2006, the disclosure content of which is hereby incorporated by reference.

FIELD OF THE INVENTION

The present invention relates to self-sealing compositions and to their use as puncture-resistant layers in inflatable articles.

The invention relates more particularly to the use of such compositions in tires for sealing off any holes due to perforations in service.

BACKGROUND OF THE INVENTION

In recent years, in particular, tire manufacturers have made particularly strenuous efforts to develop novel ways of solving a problem dating back from the very start of the use of wheels fitted with inflated tires, namely how to allow a vehicle to continue to travel despite a substantial or total loss of pressure of one or more tires. For decades, the spare wheel was considered to be the only and universal solution. Then, more recently, the considerable advantages of possibly dispensing with the spare tire have appeared. The concept of "extended mobility" was developed. The associated techniques allow the vehicle to run with the same tire, dependent on certain limitations to be respected, after a puncture or a pressure drop. This makes it possible for example to get to a point of repair without having to stop, often in hazardous circumstances, to fit the spare wheel.

Self-sealing compositions that can achieve such an objective, which by definition are capable automatically, i.e. without any external intervention, of sealing a tire in the event of it being punctured by a foreign body, such as a nail, have been particularly difficult to develop.

To be able to be useful, a self-sealing layer must satisfy many conditions of a physical and chemical nature. It must in particular be effective over a very wide operating temperature range and over the entire lifetime of the tires. It must be capable of closing up the hole when the puncturing object remains in place and, when the latter is expelled, it must be able to fill the hole and seal the tire, especially under winter conditions.

Many solutions have been conceived, but have not been able to be developed in vehicle tires, especially owing to the lack of stability over time or the lack of effectiveness under extreme operating temperature conditions.

To help to remain effective at high temperature, document U.S. Pat. No. 4,113,799 (or FR-A-2 318 042) has proposed as self-sealing layer a composition comprising a combination of partially crosslinked butyl rubbers of high and low molecular weights, possibly in the presence of a small portion of a thermoplastic styrene elastomer. For good sealing effectiveness, said composition contains 55% to 70% by weight of a tackifier.

Document U.S. Pat. No. 4,228,839 has proposed as self-sealing layer for a pneumatic tire a rubber compound containing a first polymer material that degrades when irradiated, such as polyisobutylene, and a second polymer material that crosslinks when irradiated, preferably a butyl rubber.

Document U.S. Pat. No. 4,426,468 has also proposed a self-sealing composition for a pneumatic tire based on crosslinked butyl rubber of very high molecular weight.

A known drawback of butyl rubbers is that they suffer large hysteretic losses (high level of tan δ) over a wide temperature range, which drawback has repercussions on the self-sealing compositions themselves, giving them a large increase in hysteresis and considerably degrading the rolling resistance of tires.

The Applicants have moreover found that these butyl-rubber-based compositions may also be insufficiently effective, especially under winter temperature conditions, after the delayed expulsion or removal of a puncturing object that has remained in place for a long period of time in the pneumatic tire structure.

Document EP-B1-1 090 069 has certainly proposed self-sealing compositions containing no butyl rubber, the specific formulation of which comprises, per 100 parts by weight of a styrene-based thermoplastic elastomer, 80 to 140 parts of a liquid plasticizer, 110 to 190 parts of a tackifying resin and 2 to 20 parts of an additive.

A large quantity of tackifying resin, apart from the resulting higher industrial cost for the tires, may also degrade the rolling resistance of the tires because of the risk of excessive stiffening of the self-sealing composition.

The Applicants have now discovered, during their research, a self-sealing composition of appreciably simplified formulation, requiring neither butyl rubber nor the use of tackifying resins, which also performs better than the self-sealing compositions of the prior art.

SUMMARY OF THE INVENTION

Thus, according to a first object, the present invention relates to the use as self-sealing composition, in an inflatable article, of an elastomer composition comprising at least, as predominant elastomer, a thermoplastic styrene (TPS) elastomer and an extender oil with a content of between 200 and 700 phe (parts per hundred parts of elastomer by weight).

One aspect of the invention relates to an airtight puncture-resistant laminate that can be used in particular in an inflatable article, comprising at least a puncture-resistant first layer comprising the self-sealing composition defined above, and an airtight second layer.

Another aspect of the invention relates to an inflatable article such as a pneumatic tire including such a self-sealing composition or such a laminate, particularly when said composition or said laminate is placed on the inner wall of said inflatable article or pneumatic tire.

Such pneumatic tires can be of the type intended to be fitted on motor vehicles of the passenger type, SUV (Sport Utility Vehicle) type, two-wheeled vehicles (especially motorcycles), aircraft, industrial vehicles, chosen from vans, heavy vehicles—i.e. underground trains, buses, road transport vehicles (lorries, towing vehicles, trailers), off-road vehicles, such as agricultural and civil-engineering vehicles—, and other transport or handling vehicles.

Another aspect of the invention relates to a method for protecting an inflatable article from being punctured, in which a puncture-resistant layer or a laminate, such as those described above, is incorporated into said inflatable article during its manufacture, or is added to said inflatable article after its manufacture.

The invention also relates to an inflatable article comprising a puncture-resistant layer or a laminate such as those described above.

BRIEF DESCRIPTION OF THE DRAWING

The invention and its advantages will be readily understood in the light of the description and the exemplary embodiments that follow, and also the single FIGURE relating to these embodiments that shows schematically, in radial cross section, a pneumatic tire with a radial carcass reinforcement using a self-sealing composition and a laminate in accordance with an embodiment of the present invention.

I. DETAILED DESCRIPTION OF THE DRAWING

In the present description, unless otherwise indicated, all the percentages (%) indicated are % by weight.

I-1. Self-Sealing Composition

The self-sealing composition or material used in accordance with the invention is an elastomer composition comprising at least, as predominant elastomer, a thermoplastic styrene elastomer and, as plasticizer, an extender oil with a weight content of between 200 and 700 phe.

I-1-A. Thermoplastic Styrene Elastomer

The thermoplastic styrene (TPS) elastomers are thermoplastic elastomers in the form of styrene-based block copolymers.

Having a structure intermediate between thermoplastic polymers and elastomers, they consist, as is known, of hard polystyrene blocks linked by soft elastomer blocks, for example to polybutadiene, polyisoprene or poly(ethylene-butylene) blocks. They are often triblock elastomers with two hard segments linked by a soft segment. The hard and soft segments may be in a linear, star or branched configuration.

Preferably, the TPS elastomer is chosen from the group consisting of styrene/butadiene/styrene (SBS), styrene/isoprene/styrene (SIS), styrene/isoprene/butadiene/styrene (SIBS), styrene/ethylene-butylene/styrene (SEBS), styrene/ethylene-propylene/styrene (SEPS) and styrene/ethylene-ethylene-propylene/styrene (SEEPS) block copolymers and blends of these copolymers.

More preferably, said elastomer is chosen from the group formed by SEBS copolymers, SEPS copolymers and blends of these copolymers.

According to another preferred embodiment of the invention, the styrene content in the TPS elastomer is between 5 and 50%.

Below the indicated minimum, the thermoplastic nature of the elastomer runs the risk of being substantially reduced, whereas above the recommended maximum the elasticity of the composition may be adversely affected. For these reasons, the styrene content is more preferably between 10 and 40%, in particular between 15 and 35%.

It is preferable for the glass transition temperature ($T_g$, measured according to ASTM D3418) of the TPS elastomer to be below −20° C., more preferably below −40° C.

A $T_g$ value above these minimum temperatures, meaning a higher $T_g$ of the self-sealing composition itself, may reduce the performance of the self-sealing composition when used at very low temperature. For such a use, the $T_g$ of the TPS elastomer is more preferably even below −50° C.

The number-average molecular weight (denoted by $M_n$) of the TPS elastomer is preferably between 50 000 and 500 000 g/mol, more preferably between 75 000 and 450 000 g/mol. Below the minimum values indicated, the cohesion between the TPS elastomer chains, because of its dilution (amount of extender), runs the risk of being degraded. Moreover, an increase in the usage temperature runs the risk of adversely affecting the mechanical properties, especially the properties at break, consequently leading to reduced "hot" performance.

Moreover, too high a molecular weight $M_n$ may be detrimental as regards the flexibility of the composition at the recommended extender oil contents. Thus, it has been found that an $M_n$ lying within the 250 000 to 400 000 range was particularly suitable, especially for use of the self-sealing composition in a pneumatic tire.

The number-average molecular weight ($M_n$) of the TPS elastomer is determined, in a known manner, by SEC (steric exclusion chromatography). The specimen is firstly dissolved in tetrahydrofuran with a concentration of about 1 g/l and then the solution is filtered on a filter of 0.45 μm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series, namely a STYRAGEL HMW7 column, a STYRAGEL HMW6E column and two STYRAGEL HT6E columns, is used. The injected volume of the polymer specimen solution is 100 μl. The detector is a WATERS 2410 differential refractometer and its associated software for handling the chromatograph data is the WATERS MILLENIUM system. The calculated average molecular weights are relative to a calibration curve obtained with polystyrene standards.

The TPS elastomer may constitute all of the elastomer matrix or the predominant portion by weight (preferably for more than 50% and more preferably for more than 70%) of the matrix when it includes one or more other elastomers, whether thermoplastic or not, for example elastomers of the diene type.

According to a preferred embodiment, the TPS elastomer is the sole elastomer and the sole thermoplastic elastomer present in the self-sealing composition.

I-1-B. Extender Oil

The second essential constituent of the self-sealing composition is an extender oil (or plasticizing oil) used in a very high amount of between 200 and 700 phe (i.e. between 200 and 700 parts per hundred parts of elastomer by weight).

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins, particularly to tackifying resins, which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

More preferably, the extender oil is chosen from the group formed by polybutenes, paraffinic oils and mixtures of these oils. Even more preferably, a polyisobutene oil, in particular a polyisobutylene (PIB) oil, is used.

Examples of polyisobutylene oils include those sold in particular by Univar under the trade name "Dynapak Poly" (e.g. "Dynapak Poly 190"), by BASF under the trade name "Glissopal" (e.g. "Glissopal 1000") or "Oppanol" (e.g. "Oppanol B12"); paraffinic oils are sold for example by Exxon under the trade name "Telura 618" or by Repsol under the brand name "Extensol 51".

The number-average molecular weight ($M_n$) of the extender oil is preferably between 200 and 30 000 g/mol, more preferably still between 300 and 10 000 g/mol.

For excessively low $M_n$ values, there is a risk of the oil migrating to the outside of the self-sealing composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran with a concentration of about 1 g/l and then the solution is filtered on a filter of 0.45 µm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 µl. The detector is a WATERS 2410 differential refractometer and its associated software for handling the chromatograph data is the WATERS MILLENIUM system. The calculated average molecular weights are relative to a calibration curve obtained with polystyrene standards.

A person skilled in the art will know, in the light of the description and the embodiments that follow, how to adjust the quantity of extender oil according to the particular usage conditions of the self-sealing composition, in particular of the inflatable article in which it is intended to be used.

It is preferable for the extender oil content to be between 250 and 600 phe. Below the indicated minimum, the self-sealing composition runs the risk of having too high a rigidity for certain applications, whereas above the recommended maximum there is a risk of the composition having insufficient cohesion. For this reason, the extender oil content is more preferably between 300 and 500 phe, especially for use of the self-sealing composition in a pneumatic tire.

I-1-C. Various Additives

The two constituents described above, namely the TPS elastomer and the extender oil, are sufficient by themselves for the self-sealing composition to completely fulfil its puncture-resistance function with regard to inflatable articles in which it is used.

However, various other additives may be added, typically in a small amount (preferably with contents of less than 20 phe, more preferably less than 10 phe), such as for example reinforcing fillers, such as carbon black, non-reinforcing or inert fillers, lamellar fillers, stabilizers, such as UV stabilizers, antioxidants or antiozonants, various other stabilizers, and colouring agents, advantageously those that can be used for colouring the self-sealing composition.

Although the self-sealing composition, thanks to its specific formulation, does not require the use of a tackifying resin (as a reminder, this is a resin giving "tack", i.e. immediate sticking, when lightly pressed to a substrate), the invention also applies to cases in which such a tackifying resin is used, and preferably in such cases in a minor proportion, typically less than 100 phe and more preferably less than 50 phe (for example between 0 and 20 phe).

Apart from the elastomers described above (TPS and other optional elastomers), the self-sealing composition may also contain, again in a minor weight fraction relative to the TPS elastomer, polymers other than elastomers, such as for example thermoplastic polymers compatible with the TPS elastomer.

The self-sealing composition or material described above is an elastic solid compound at 23° C., which is especially characterized, thanks to its specific formulation, by a very high flexibility and deformability.

According to one particular embodiment of the invention, especially when used in a pneumatic tire, said self-sealing composition has, for any temperature between +30° C. and +100° C., a loss factor (tan δ) of less than 0.2, more preferably less than 0.15, and a dynamic shear modulus G* of less than the service inflation pressure (denoted by $P_i$) of the inflatable article in question (in particular less than 0.1 MPa), G* being more preferably between $P_i/30$ and $P_i$ (in particular between 0.01 and 0.1 MPa), both tan δ and G* being measured at a frequency of 10 Hz. These dynamic properties are measured in a known manner, on an Anton Paar "MCR 301" rheometer; the specimens are cylindrical with a thickness of 2.5 mm and a diameter of 4 mm, and are placed in a thermal chamber between two flat plates, one being fixed and the other oscillating sinusoidally about its centre; a normal stress of 0.02 MPa is also applied throughout the duration of the tests; a maximum deformation of 1% is imposed and a temperature scan from −100° C. to +250° C. is carried out with a temperature ramp of 5° C./min.

According to another particular embodiment of the invention, the self-sealing composition has an elongation at break of greater than 500%, more preferably greater than 800%, and a stress at break of greater than 0.2 MPa, these two quantities being measured at first elongation (i.e. without an accommodation cycle) at a temperature of 23° C., with a pull rate of 500 mm/min (ASTM D412 standard), and normalized to the initial cross section of the test piece.

TPS elastomers, such as SEPS or SEBS, extended with high levels of oils, are well known and commercially available in the extended form. As examples, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), and those sold by Multibase under the name "Multiflex" (e.g. "Multiflex G00").

These products, developed in particular for medical, pharmaceutical or cosmetic applications, may be processed conventionally in respect of TPEs by extrusion or moulding, for example starting from a raw material available in bead or granule form.

Completely surprisingly, they have proved to be capable, after a possible adjustment, if necessary, of their extender oil content within the range recommended by the present invention (i.e. between 200 and 700 phe, preferably between 250 and 600 phe), of fulfilling the function of an effective self-sealing composition, as will be explained in detail below.

I-2. Use of the Self-Sealing Composition as Puncture-Resistant Layer

The self-sealing composition described above is used as puncture-resistant layer in any type of "inflatable" article, i.e. by definition, any article that pursues its usable shape when it is inflated with air.

As examples of such inflatable articles, mention may be made of inflatable boats, balloons and balls used for games or sports.

Said composition is particularly suitable for use as puncture-resistant layer in an inflatable article, whether a finished or semi-finished product, made of rubber, most particularly in a pneumatic tire for a motor vehicle, such as a two-wheeled, passenger or industrial vehicle, or a non-motorized vehicle, such as a bicycle.

Such a puncture-resistant layer is preferably placed on the inner wall of the inflatable article, completely or at least partly covering it, but it may also be completely integrated into its internal structure.

The thickness of the puncture-resistant layer is preferably greater than 0.3 mm, more preferably between 0.5 mm and 10 mm (in particular between 1 and 5 mm).

It will be readily understood that, depending on the specific fields of application and on the dimensions and pressures involved, the method of implementing the invention may vary, the puncture-resistant layer then having several preferential thickness ranges. Thus, for example, in the case of passenger vehicle tires, it may have a thickness of at least 0.4 mm, preferably between 0.8 and 2 mm. According to another example, in the case of commercial or agricultural vehicle tires, the preferred thickness may be between 1 and 3 mm. According to another example, in the case of tires for vehicles in the civil engineering field or for aircraft, the preferred thickness may be between 2 and 10 mm. Finally, according to another example, for bicycle tires, the preferred thickness may be between 0.4 and 2 mm.

The self-sealing composition described here has the advantage of exhibiting, over a very wide range of pneumatic tire operating temperatures, practically no degradation in rolling resistance compared with a pneumatic tire that does not include such a self-sealing layer. Compared with the usual self-sealing compositions, it very substantially improves the rate of sealing of the hole left after delayed removal of a puncturing object.

Moreover, the usual self-sealing compositions are very susceptible to creep. When tires are running, said compositions are often expelled from the sidewall part of these tires due to the effect of the centrifugal forces and accumulate under their crown part. This is not the case for the compositions recommended by the present invention, which may be placed throughout the inner part of the tires.

I-3. Airtight Self-Sealing Laminate

Of course, the invention applies to cases in which the self-sealing composition described above is used in a pneumatic tire or in any other inflatable article without it necessarily being combined with an airtight layer.

However, according to a particular and preferred embodiment of the invention, the self-sealing composition is combined with at least an airtight second layer, to form an airtight self-sealing multilayer laminate that can be used in particular as inner wall of an inflatable article such as a pneumatic tire.

The second layer of the laminate may comprise any type of material capable of fulfilling the function of a film impermeable to air (or more generally to gases), which may for example be a very thin metallic material or a polymer material.

Preferably, this airtight layer has a thickness of greater than 0.05 mm, and more preferably between 0.05 and 6 mm (for example from 0.1 to 2 mm).

According to a preferred embodiment, this airtight second layer comprises a butyl rubber composition. The term "butyl rubber." should be understood, as is known, to mean an isobutylene/isoprene copolymer (the abbreviation IIR) and halogenated, preferably chlorinated or brominated, versions of this type of copolymer. Preferably, the butyl rubber is a halogenated butyl rubber or a blend of halogenated and non-halogenated butyls.

The butyl rubber may be used by itself or in combination with one or more other elastomers, especially one or more diene elastomers, such as for example natural rubber or a synthetic polyisoprene. The airtight composition also contains the various additives usually present in the airtight layers known to those skilled in the art, such as reinforcing fillers, like carbon black, lamellar fillers that improve the sealing (e.g. phyllosilicates such as kaolin, talc, mica, clays or organomodified clays (called "organo clays")), stabilizers, such as antioxidants or antiozonants, a crosslinking system (for example a sulphur-based or peroxide-based system), various processing aids and other stabilizers.

The two layers of the laminate according to the invention may be assembled by any suitable means, for example by a simple heat treatment, preferably under pressure (for example for a few minutes at 150° C. under a pressure of 16 bar), with the aid of various adhesives or else by inserting an adhesive third layer fastening the other two layers together.

II. Exemplary Embodiment of the Invention

The multilayer laminate of the invention can be advantageously used in tires of all types, particularly tires for passenger vehicles or industrial vehicles, such as heavy goods vehicles.

As an example, the single appended FIGURE shows very schematically (not drawn to scale) a radial cross section of a pneumatic tire incorporating a laminate according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The pneumatic tire 1 is characterized in that its inner wall includes a multilayer laminate according to the invention, comprising at least two layers (10a, 10b), said laminate being self-sealing thanks to its first layer (10a) and airtight thanks to its second layer (10b).

In accordance with a preferred embodiment of the invention, the two layers (10a, 10b) cover substantially the entire inner wall of the pneumatic tire, extending from one sidewall to the other, at least as far as the rim flange when the pneumatic tire is in the fitted position. In other possible embodiments, the layer 10a could however cover only a portion of the airtight region (layer 10b), for example only the crown region of the pneumatic tire, or could extend at least from the crown region down to the mid-point of the sidewall (equator) of said pneumatic tire.

According to another preferred embodiment, the laminate is placed in such a way that the self-sealing first layer (10a) is radially innermost in the pneumatic tire relative to the other layer (10b), as shown schematically in the appended FIGURE. In other words, the self-sealing layer (10a) covers the airtight layer (10b) on the side facing the internal cavity 11 of the pneumatic tire 1. Another possible embodiment is that in which this layer (10a) is radially outermost relative to the other layer (10b), then placed between the airtight layer (10b) and the rest of the structure of the pneumatic tire 1.

In this example, the layer 10b (with a thickness of 0.7 to 0.8 mm) is based on butyl rubber having a conventional formulation for an inner liner, which usually defines, in a conventional pneumatic tire, the radially internal face of said pneumatic tire intended to protect the carcass reinforcement from diffusion of air coming from the internal space of the pneumatic tire. This airtight layer 10b therefore enables the pneumatic tire 1 to be inflated and kept under pressure. Its sealing properties enable it to guarantee a relatively low rate of pressure loss, making it possible to keep the pneumatic tire inflated, in the normal operating state, for a sufficient time, normally several weeks or several months.

The layer 10a (with a thickness of about 2 mm) consists of the "Mediprene 500000M" product described above, the two essential constituents of which are an SEBS elastomer (with a styrene content of about 30%, a $T_g$ close to –60° C. and an $M_n$ of around 300 000 g/mol) and a paraffinic extender oil ($M_n$ of around 600 g/mol) with a weight content of about 400 phe.

This layer 10a, therefore placed between the layer 10b and the cavity 11 of the pneumatic tire, provides the pneumatic tire with effective protection against pressure losses due to accidental perforations, by enabling these perforations to be automatically sealed.

If a foreign body such as a nail passes through the structure of the inflatable article, for example a wall such as a sidewall 3 or the crown 6 of the pneumatic tire 1, the composition serving as self-sealing layer is subjected to several stresses. In reaction to these stresses, and thanks to its advantageous deformability and elasticity properties, said composition creates a sealed contact region around the entire body. It matters little whether the outline or profile of said body is uniform or regular, the flexibility of the self-sealing composition enabling it to penetrate into minute openings. This interaction between the self-sealing composition and the foreign body seals up the region affected by the latter.

In the event of the foreign body being removed, whether accidentally or intentionally, a perforation remains, which can generate a relatively substantial leak, depending on its size. The self-sealing composition, exposed to the hydrostatic pressure, is sufficiently flexible and deformable to close up, by deforming, the perforation, preventing the inflation gas from leaking out. Especially in the case of a pneumatic tire, it has turned out that the flexibility of the self-sealing composition can withstand without any problem the forces from the surrounding walls, even during deformation phases of the loaded pneumatic tire and when the latter is running.

The pneumatic tire provided with its puncture-resistant layer (10a) as described above may be produced before or after vulcanization (curing).

In the first case (i.e. before the pneumatic tire is vulcanized), the self-sealing composition is simply applied in a conventional manner at the desired place, so as to form the layer 10a. The vulcanization is then carried out conventionally. The TPS elastomers are well able to withstand the stresses associated with the vulcanization step.

An advantageous manufacturing variant, for a person skilled in the art of tires, would consist for example during a first step in laying down the self-sealing composition flat, directly on a building drum, in the form of a skim with a suitable thickness (for example 3 mm), before this is covered with the airtight layer followed by the rest of the structure of the pneumatic tire, according to the manufacturing techniques well known to a person skilled in the art. This type of process also makes it possible for the second embodiment in which the airtight layer 10b is radially outermost to be easily implemented.

In the second case (i.e. after vulcanization of the pneumatic tire), the self-sealing composition is applied to the inside of the cured pneumatic tire, by any appropriate means, for example by bonding, by spraying or by extrusion and blow moulding a film of suitable thickness.

During trials, passenger car tires of 205/55 R16 "Energy 3" size were tested. The inner wall of the tires (already including the airtight layer 10b) was covered with the self-sealing layer (10a) described above ("Mediprene 500 000M"), with a thickness of 2 mm, and then the tires were vulcanized.

On one of the fitted and inflated tires, five perforations 6 mm in diameter and two perforations 1 mm in diameter were produced, through the tread and the crown block on the one hand, and through the sidewalls on the other, using punches that were immediately removed.

Unexpectedly, this pneumatic tire withstood being run on a flywheel rolling test at 130 km/h, with a nominal load of 400 kg, without loss of pressure for more than 6300 km, after which distance the rolling test was stopped.

On another pneumatic tire, the same procedure was carried out, this time leaving the puncturing objects in place for one week. The same excellent result was obtained.

With no self-sealing composition and under the same conditions as above, the pneumatic tire thus perforated loses pressure in less than one minute, becoming completely unsuitable for being driven.

The invention claimed is:

1. An inflatable article comprising, as a self-sealing composition, an elastomer composition comprising, as predominant elastomer, a thermoplastic styrene (TPS) elastomer and an extender oil with a content of between 200 and 700 phe (parts per hundred parts of elastomer by weight); and wherein the number-average molecular weight ($M_n$) of the extender oil is between 300 and 10,000 g/mol.

2. The inflatable article according to claim 1, wherein the TPS elastomer is chosen from the group consisting of styrene/butadiene/styrene (SBS), styrene/isoprene/styrene (SIS), styrene/isoprene/butadiene/styrene (SIBS), styrene/ethylene-butylene/styrene (SEBS), styrene/ethylene-propylene/styrene (SEPS) and styrene/ethylene-ethylene-propylene/styrene (SEEPS) block copolymers and blends of these copolymers.

3. The inflatable article according to claim 2, wherein the TPS elastomer is chosen from the group formed by SEBS copolymers, SEPS copolymers and blends of these copolymers.

4. The inflatable article according to claim 1, wherein the TPS elastomer comprises between 5 and 50% styrene by weight.

5. The inflatable article according to claim 1, wherein the glass transition temperature ($T_g$) of the TPS elastomer is below –20° C.

6. The inflatable article according to claim 1, wherein the number-average molecular weight ($M_n$) of the TPS elastomer is between 50 000 and 500 000 g/mol.

7. The inflatable article according to claim 1, wherein the extender oil is chosen from the group formed by polyolefin oils, paraffinic oils, naphthenic oils, aromatic oils, mineral oils and mixtures of these oils.

8. The inflatable article according to claim 7, wherein the extender oil is chosen from the group formed by polybutene oils, paraffinic oils and mixtures of these oils.

9. The inflatable article according to claim 1, wherein the extender oil content is between 250 and 600 phe.

10. The inflatable article according to claim 1, wherein the self-sealing composition is configured in the form of a puncture-resistant layer, the thickness of which is greater than 0.3 mm.

11. The inflatable article according to claim 10, wherein the puncture-resistant layer is deposited on the inner wall of the inflatable article.

12. The inflatable article according to claim 1, wherein the inflatable article is a rubber article.

13. The inflatable article according to claim 12, wherein the inflatable article is a pneumatic tire.

14. The inflatable article according to claim 10, wherein the puncture-resistant layer is combined with an airtight layer, thus forming an airtight self-sealing laminate.

15. An airtight puncture-resistant laminate for an inflatable article, comprising:

a puncture-resistant first layer comprising the self-sealing composition according to claim 1; and an airtight second layer.

16. The laminate according to claim 15, wherein the airtight layer comprises a butyl rubber composition.

17. The laminate according to claim 15, wherein the puncture-resistant layer has a thickness of greater than 0.3 mm.

18. An inflatable article, wherein a laminate according to claim 15 constitutes an inner wall of the inflatable article.

19. The inflatable article according to claim 18, wherein the inflatable article is a rubber article.

20. The inflatable article according to claim 19, wherein the inflatable article is a pneumatic tire.

21. A method for protecting an inflatable article from being punctured, comprising incorporating a puncture-resistant layer into the inflatable article during its manufacture, or adding the layer to the inflatable article after its manufacture, said puncture-resistant layer comprising the self-sealing composition according to claim 1.

22. A method for protecting an inflatable article from being punctured, comprising incorporating a puncture-resistant layer into the inflatable article during its manufacture, or adding the layer to the inflatable article after its manufacture, said puncture-resistant layer comprising the airtight puncture-resistant laminate according to claim 15.

* * * * *